(No Model.)

W. B. CARTER.
ANT TRAP.

No. 528,921. Patented Nov. 13, 1894.

Witnesses:
L. C. Hills.
J. W. Deyhue.

Inventor:
William B. Carter
By Glascock & Co.
Atty's.

THE NORRIS PETERS CO., PHOTO-LITHO., WASHINGTON, D. C.

UNITED STATES PATENT OFFICE.

WILLIAM B. CARTER, OF MEXIA, TEXAS.

ANT-TRAP.

SPECIFICATION forming part of Letters Patent No. 528,921, dated November 13, 1894.

Application filed August 3, 1894. Serial No. 519,325. (No model.)

*To all whom it may concern:*

Be it known that I, WILLIAM BARNEY CARTER, a citizen of the United States, residing at Mexia, in the county of Limestone and State of Texas, have invented a certain new, useful, and valuable Improvement in Ant-Traps, of which the following is a full, clear, and exact description.

My invention has relation to ant traps and it consists in the novel construction and arrangement of its parts as hereinafter described.

Figure 1:
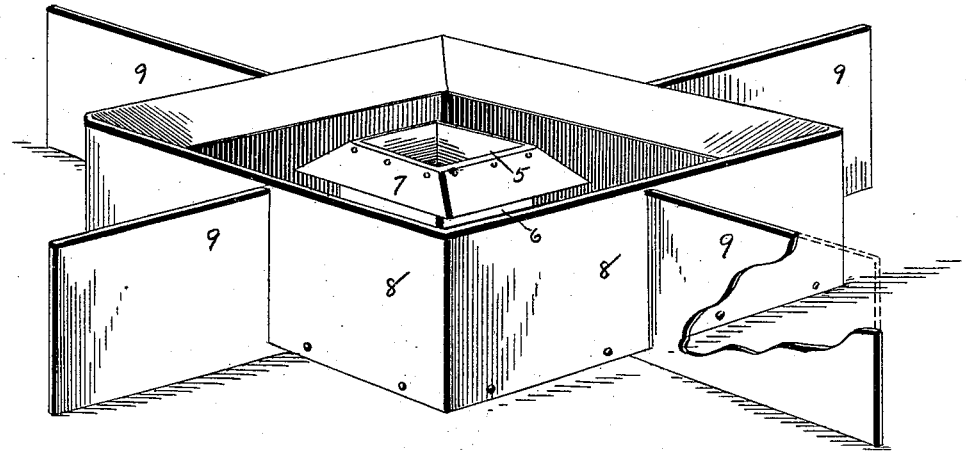
Figure 2:
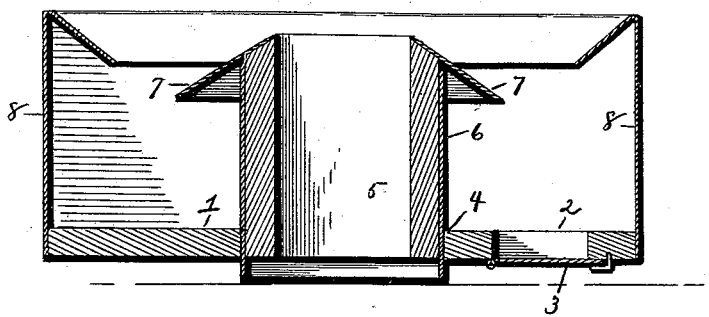
Figure 3:
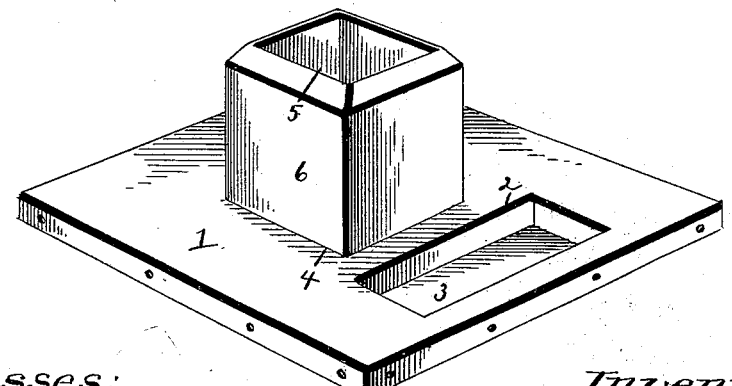

In the accompanying drawings:—Figure 1, is a perspective view of my invention. Fig. 2, is a sectional view of my invention. Fig. 3, is a perspective view of the bottom and central part of the trap.

The bottom 1, of the trap is made of wood or other inflexible material and is provided with a perforation 2, which is closed by a sliding panel 3. The center of the bottom is also provided with a perforation 4. The perforation 4, is provided with a perpendicular passage 5, the inner sides of which are rough while the outer sides are covered with the tin 6, which extends below the bottom of the trap. The top of the passage 5, is provided with the inclined sheets of tin 7, 7.

The bottom of the trap is made of wood or other inflexible material, in order that the trap will not bend out of shape; thus adding greatly to the strength and utility of the trap.

The perpendicular sides 8, of the trap are made preferably of tin, or other smooth material. They are secured to the edges of the bottom and the upper edges of the sides are bent toward the center and inclined downward.

Each side of the trap is provided with a perpendicular flange 9, which tends to keep the ants from running around the trap. It is a habit of the ant to run on the ground close to an object, and when they run around the trap close to the smooth sides of the trap and come to the flanges 9, (which are rough surfaced) they will crawl up the said flanges and then enter the trap.

The trap is placed over an ant hill the mouth of the hill being just below the passage 5, and the lower edges of the tin 6, are pressed into the ground. Thus the ants as they come out of the hill must pass up the passage 5, and enter the trap. When once in the trap the smooth perpendicular sides and inclined flanges will prevent them getting out. If necessary sugar or other articles may be placed in the trap to attract the ants. The ants can be killed by hot water and washed out of the trap through the perforation 2.

Having described my invention, what I claim as new, and desire to secure by Letters Patent, is—

1. An ant trap having an inflexible bottom with a central perforation; a perpendicular passage having a rough interior and a smooth exterior located in said perforation and perpendicular smooth sides attached to the edges of said bottom, as set forth.

2. An ant trap having an inflexible bottom with a central perforation; a perpendicular passage having a rough interior and smooth exterior located in said perforation and perpendicular smooth sides attached to the edges of said bottom; and a perforation in said bottom closed by a movable panel, as set forth.

3. In combination with an ant trap a device for preventing ants from running around the trap, consisting of perpendicular flanges secured to the sides of the trap and adapted to guide the ants up the sides thereof and into the trap, as set forth.

In testimony whereof I affix my signature in presence of two witnesses.

WILLIAM B. CARTER.

Witnesses:
   J. W. BLAKE,
   J. S. SMITH.